US006269928B1

(12) United States Patent
Kamm

(10) Patent No.: US 6,269,928 B1
(45) Date of Patent: *Aug. 7, 2001

(54) AUTOMATIC BOTTOM-HINGED INTAKE DOOR

(75) Inventor: Christian Philip Kamm, Fairview Park, OH (US)

(73) Assignee: Wilkinson Company, Inc., Stow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/693,162

(22) Filed: Oct. 23, 2000

Related U.S. Application Data

(63) Continuation of application No. 09/476,552, filed on Jan. 3, 2000, now Pat. No. 6,186,306, which is a continuation of application No. 09/081,641, filed on May 20, 1998, now Pat. No. 6,062,368, and a continuation of application No. 08/549, 264, filed on Oct. 27, 1995, now abandoned.

(51) Int. Cl.[7] .................................................. B65G 11/20

(52) U.S. Cl. .......................................... 193/31 A; 49/139

(58) Field of Search .......................... 193/31 A; 49/339, 49/394, 280, 281, 282, 385, 386, 371, 324, 326, 139

(56) References Cited

U.S. PATENT DOCUMENTS 1,770,267 7/1930 Gilroy .
1,920,868 8/1933 Kirk .
2,475,985 7/1949 Parsons .
2,905,464 9/1959 Shaw .
3,016,261 1/1962 Tatter .
3,156,954 11/1964 Haught .
3,557,497 1/1971 Schafer et al. .
3,645,042 2/1972 Bolli .
3,785,089 * 1/1974 Smith .................................... 49/139
3,857,197 * 12/1974 Reddy et al. ............................ 49/13
3,943,843 * 3/1976 Steinberg et al. ..................... 100/51
3,990,739 * 11/1976 Head ..................................... 296/56
4,307,541 * 12/1981 Farmer et al. ......................... 49/280
4,365,442 12/1982 Speer .
4,366,595 1/1983 Elliott .
4,473,201 * 9/1984 Barnes et al. .................... 244/129.5
4,497,135 2/1985 Vetter .
4,655,004 * 4/1987 Caillet ................................... 49/280
4,660,324 4/1987 Nyenbrink .
4,665,649 5/1987 Hund, Jr. .
4,723,373 2/1988 Jump .
4,802,604 2/1989 Lindsey .
5,040,331 8/1991 Merendino et al. .
5,050,346 9/1991 Eccleston .
5,054,239 10/1991 Tucker et al. .
5,101,595 4/1992 Rhoades .
5,505,649 4/1996 Park .
5,515,649 5/1996 Strab .
5,563,483 10/1996 Kowall et al. .
5,589,747 12/1996 Utke .
5,592,780 * 1/1997 Checkovich .......................... 49/386
5,655,331 8/1997 Schrader et al. .
6,062,368 * 5/2000 Kamm ............................... 193/31 A
6,186,306 * 1/1974 Kamm ............................... 193/31 A

* cited by examiner

*Primary Examiner*—Daniel P. Stodola
*Assistant Examiner*—Curtis Cohen
(74) *Attorney, Agent, or Firm*—Vickers, Daniels & Young

(57) ABSTRACT

An automatic chute closure for covering a chute opening wherein the chute closure includes a frame disposed around a chute opening, a chute door pivotally connected to the frame for movement between an opened and closed position, a door movement mechanism for opening and closing the chute door, a switch mechanism for activating and deactivating the door movement mechanism and a latch mechanism for securing the chute door in a closed position until the switch mechanism is activated to open the chute door. The automatic chute closure allows an operator to conveniently activate a single switch to open and close the chute door and to insure once the chute door is closed it is properly locked.

4 Claims, 9 Drawing Sheets

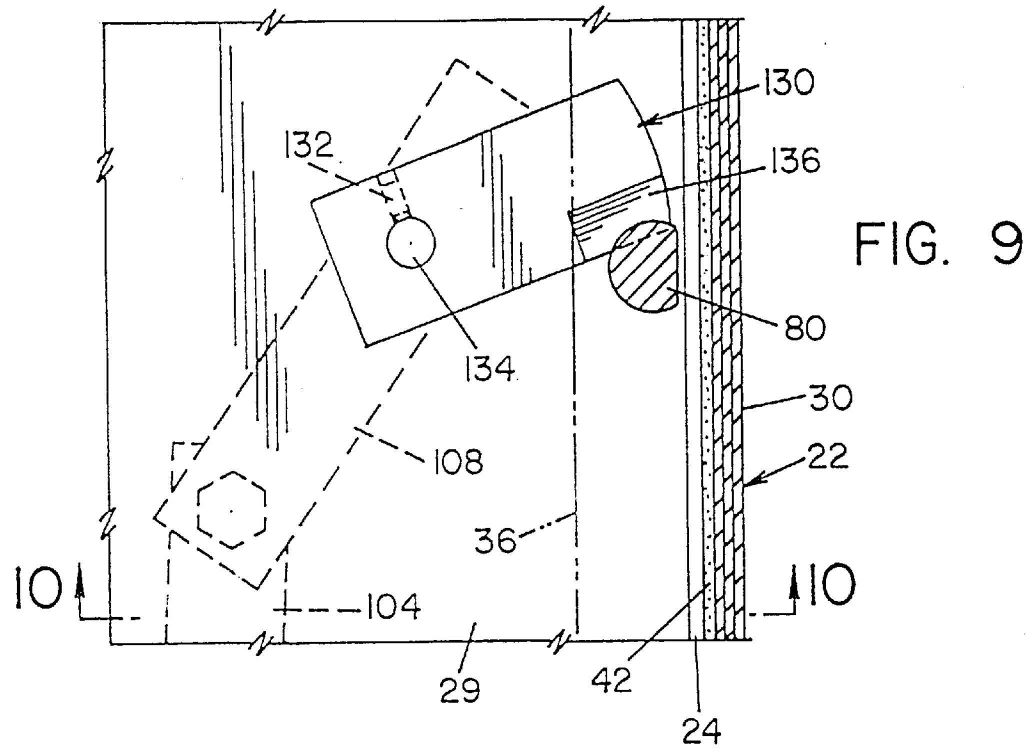
FIG. 9
FIG. 10
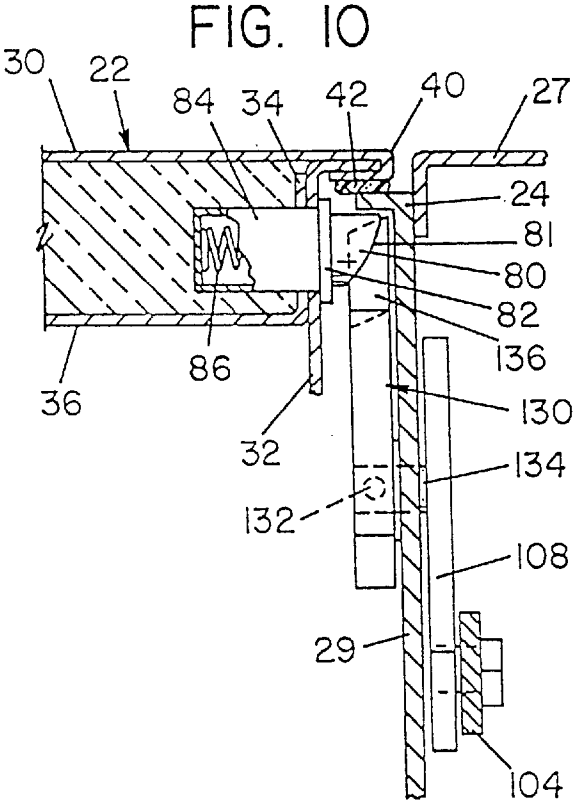

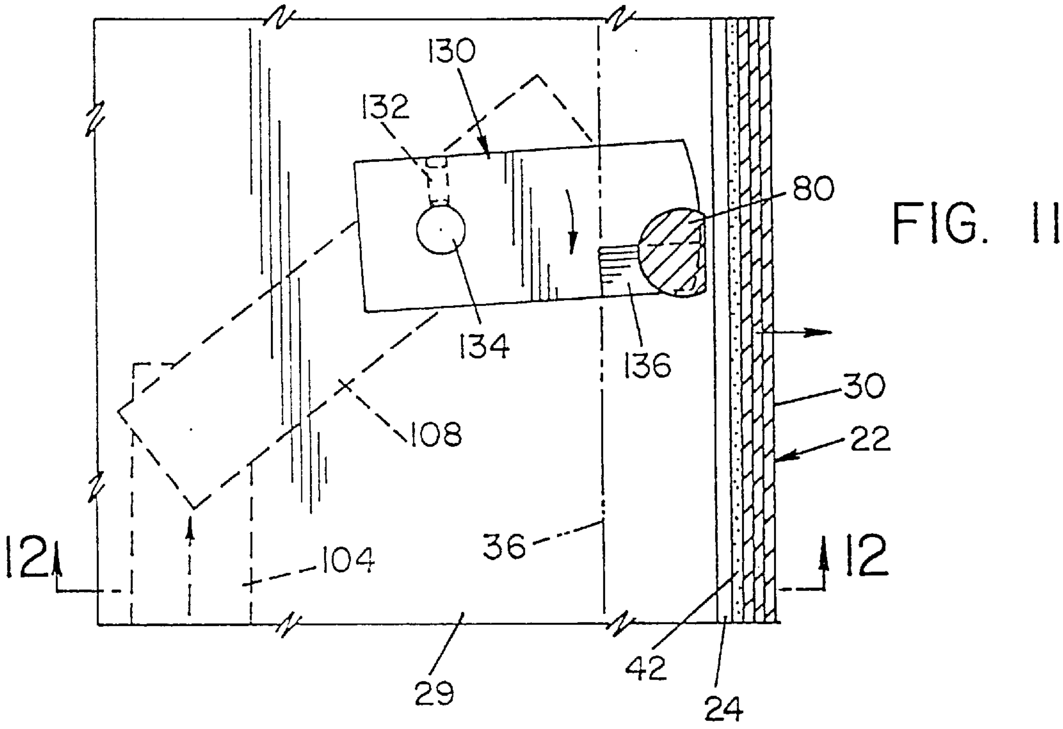
FIG. 11
FIG. 12
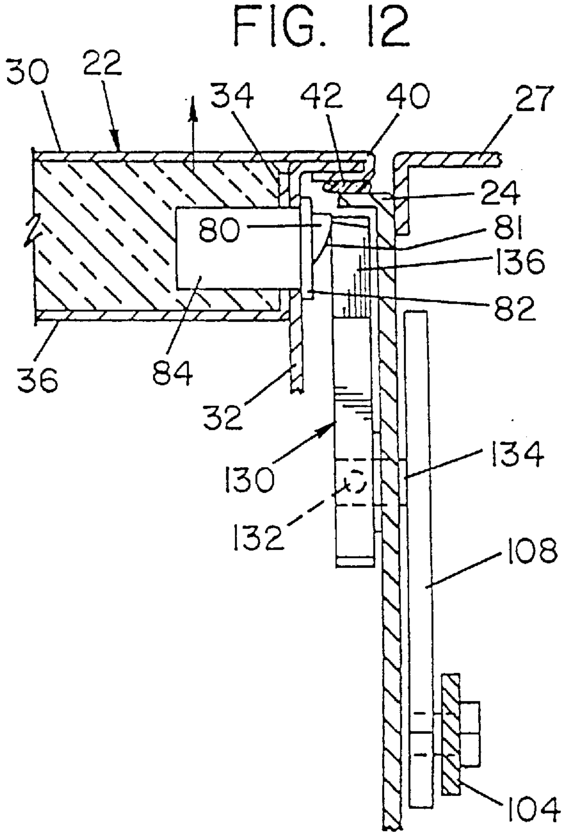

AUTOMATIC BOTTOM-HINGED INTAKE DOOR

This is a continuation of application Ser. No. 09/476,552 filed Jan. 3, 2000, now U.S. Pat. No. 6,186,306, which has claimed priority under 35 U.S.C. § 120 from application Ser. No. 09/081,641 filed May 20, 1998, which issued as U.S. Pat. No. 6,062,368 on May 16, 2000; and application Ser. No. 08/549,264, Oct. 27, 1995 now abandoned, each of which is incorporated herein by reference.

BACKGROUND OF THE INVENTION

This invention relates to the art of chute systems and, more particularly, to an automatic chute door integrated into a chute system.

Chute systems are commonly used to provide a convenient way of storing or disposing of various articles. Chute systems are used in medical facilities for the disposal of various types of medical products. Chute systems are also used in apartment buildings and various industries for the disposal of refuse. Chute systems are also used in homes, hotels and hospitals to store linens for later cleaning. Chute systems can further be used to separate and/or store recyclable items.

A typical chute system includes a chute and a storage bin. The articles are placed in the chute opening and the chute guides the articles to the storage bin for immediate or later processing. If the chute system is for waste insertion, the storage bin is typically a furnace and the articles placed in the chute are immediately processed upon entering the furnace. The chute opening can include a chute door to close the chute opening until just prior to an article being placed into the chute opening. The chute door enhances the safety and sanitation of the chute system. Medical products which are disposed in a chute system can pose potential health and/or safety risks if a chute door is not included on the chute opening. An unclosed chute opening could allow harmful and/or contaminated products to harm an individual who inadvertently comes in contact with the chute opening without proper protection. The incorporation of a chute in such facilities reduces such risks. Furthermore, chute systems used to dispose of waste are prone to fires and/or small explosions occurring in the storage bin. Such fires or explosions could cause damage to areas outside of the chute opening if a chute door is not used. The use of a chute door also reduces and/or prevents gases and/or fine particles in the chute and storage bin from escaping through the chute opening, especially where such gases and/or particles are noxious, harmful and/or infectious. Furthermore, chute doors are used to prevent children from injury due to climbing in and playing around a chute opening.

Although past chute systems have commonly employed chute doors, these prior chute door's designs have proven to be, in many cases, safety risks in-of-themselves. Many of the chute doors used in the disposal of refuse are not fire rated to resist exposure to a fire or made durable enough to withstand an explosion in the storage bin. As a result, damage to facilities outside the chute opening are not always avoided in the case of fire. Further, small explosions in the storage bin result in the chute door being inoperably damaged and/or destroyed. Furthermore, chute doors that have been designed to be fire resistant and/or explosion resistant have not been designed to properly seal the closure opening from releasing flames caused by a fire and/or from releasing gases various chemicals within the storage bin. In addition, prior chute doors typically do not include a latch mechanism to secure the chute door from being jarred open when an explosion occurs in the chute or storage bin. Chute doors which have included latch mechanisms have suffered from complicated designs and/or unreliable latching of the chute door. As a result, the chute door remains unsecure thus not providing the proper security the chute door was originally designed for.

In view of the past design and safety deficiencies of prior chute closures, there is a need to provide a chute door which is easily operable and ensures a secure closure to prevent the chute door from inadvertently opening due to a fire and/or explosion in the storage bin and further seal the chute opening from releasing flames and/or gases when the chute door is in the closed position.

THE SUMMARY OF THE INVENTION

In accordance with the present invention, an improved chute system is provided which minimizes and/or overcomes the foregoing disadvantages of prior chute systems heretofore available while, at the same time, maintaining the advantage of simplicity of use with respect to opening and closing the chute door and insuring the chute door is properly closed.

More particularly, in accordance with the present invention, a chute system is provided which includes a chute closure for covering a chute opening. The chute closure includes a frame disposed about the chute opening, a chute door pivotally connected to the frame for moving between a closed position and an open position, a door movement mechanism for opening and closing the chute door, a switch mechanism for activating and deactivating the door movement mechanism and a latch mechanism for securing the chute door in a closed position until the switch mechanism is activated to open the chute door. The improved assembly for a chute closure allows an operator to conveniently activate a single switch to open and close the chute door. The improved assembly also ensures that when the chute door is closed, the chute door is properly secured in the closed position and will not inadvertently open until the operator activates the switch mechanism to open the chute door. The latch mechanism is preferably integrated with the door movement mechanism to insure for proper latching of the chute door when the operator activates the chute system to close the chute door. The latch mechanism is designed to insure the chute door will not inadvertently open when a fire and/or an explosion occurs in the storage bin. The chute door is preferably connected to the base of the frame to pivot about the base of the frame. The chute system is preferably made of fire resistant materials such as carbon steel and stainless steel to prevent or reduce damage to the chute system and ensure the chute system complies with safety guidelines in the event of a fire and/or explosion in the chute and/or storage bin.

In accordance with another aspect of the present invention, the latch mechanism includes a latch bolt which is integrated into the chute door. The latch bolt engages the frame of the chute system when the chute door is in the closed position thereby preventing the chute door from inadvertently opening. The latch bolt is also designed to be easily disengaged from the frame of the chute system when the operator activates the switch mechanism to open the chute door. The latch mechanism is preferably integrated with the door movement mechanism so that the activation of the door movement mechanism also activates the latch mechanism to latch and unlatch the chute door from the door frame. The integration of the latch mechanism with the door movement mechanism insures that the latch bolt is properly retracted when the operator activates the chute door to be opened, insures that the latch bolt is properly engaged with the chute door frame when the chute door is moved to the closed position by the door movement mechanism and simplifies the locking and unlocking of the chute door.

In accordance with another aspect of the present invention, the chute door includes a flange positioned about the peripheral edge of the chute door to cover any space between the chute door and the frame of the chute closure when the chute door is in the closed position. The flange preferably includes a sealing material to reduce or prevent flames, smoke and/or noxious gases from escaping along the side of the chute door when the chute door is in a closed position. The flange is preferably designed to also provice a barrier against flames or a rush of gases from projecting from the chute door when an explosion and/or fire has occurred in the storage bin. The flange is preferably made of materials similar to the chute door. The sealing material is preferably composed of a rubber or plastic material.

In accordance with another aspect of the present invention, the door movement mechanism includes an electric motor which is connected to the switching mechanism for controlling the opening and closing of the chute door. The electric motor is preferably a linear motion motor. The use of a linear motion motor reduces the space needed for the door movement mechanism and further simplifies and enhances the operation of the door movement mechanism.

In accordance with another aspect of the present invention, the door movement mechanism includes a counter balance which continues the weight of the chute door during the opening and the closing of the chute door. The counter balance is preferably designed to essentially neutralize the weight of the chute door during the opening and closing of the chute door. If the counter balance is used in conjunction with an electric motor, the counter balance allows for a smaller sized electric motor to be used for the opening and the closing of the chute door. Preferably, the counter balance is a gas spring. Preferably, the gas spring counter balance is integrated with linear motion motor in the door movement mechanism.

In accordance with another aspect of the present invention, a switch mechanism is incorporated in the chute system and includes an actuator switch, when activated by an operator, activates the door movement mechanism to open or close the chute door. The switch mechanism preferably includes a control mechanism for deactivating the door movement mechanism when the chute door is indicated to be in the open position or indicated to be in the closed position. Such a control mechanism prevents the electric motor from continuing to work even though the chute door is in the complete open position or the complete closed position. Preferably, the switch mechanism also includes a timer mechanism to shut off power to the electric motor after a certain period of time has elapsed after the actuator switch has been activated. The timer mechanism prevents the electric motor from continuing to work when the chute door inadvertently jams in a partially open position or the indicators which indicate a completely open or closed chute door have malfunctioned.

It is an object of the present invention to provide a chute system which include a chute door that can be easily operated.

It is another object of the present invention to provide a chute system of the foregoing character which includes chute door which remains in a closed position when a fire or explosion occurs in the chute and/or storage bin.

It is yet another object of the present invention to provide a chute system of the foregoing character which includes a chute door closure which is fire resistant.

It is still yet another object of the present invention to provide a chute system of the foregoing character which includes an automatic chute door which is opened and closed by an electric motor and a counter balance.

It is another object of the present invention to provide a chute system of the foregoing character which includes a control mechanism which indicates when the chute door is in an open and closed position and further prevents continued working of an electric motor the chute door is jammed in a partially opened position or one of the chute door position indicators has malfunctioned.

it is yet another object of the present invention to provide a chute system of the foregoing character which includes a lock mechanism integrated with a door movement mechanism to insure that the chute door is properly unlatched and latched in its respective open and closed positions.

It is another object of the present invention to provide a chute system of the foregoing character which reduces flames and/or gases from exiting the chute opening by way of the chute door.

It is still another object of the present invention to provide a chute system of the foregoing character which is easy to operate, maintain and install.

These and other objects and advantages will become apparent to those skilled in the art upon reading the following description taken together with the accompanying drawings.

THE BRIEF DESCRIPTION OF THE DRAWINGS

Reference may now be made to the drawings, which illustrate various embodiments that the invention may take in physical form and in certain parts and arrangement of parts wherein:

FIG. 9 is an enlarged cross-sectional elevation view taken along line 9—9 of FIG. 6;

FIG. 10 is a cross-sectional view taken along line 10—10 of FIG. 9;

FIG. 11 is an alternate position of the view as shown in FIG. 9; and,

FIG. 12 is a cross-sectional view taken along line 12—12 of FIG. 11.

DETAILED DESCRIPTION OF THE PREFERRED EMBODIMENT

Figure 1:
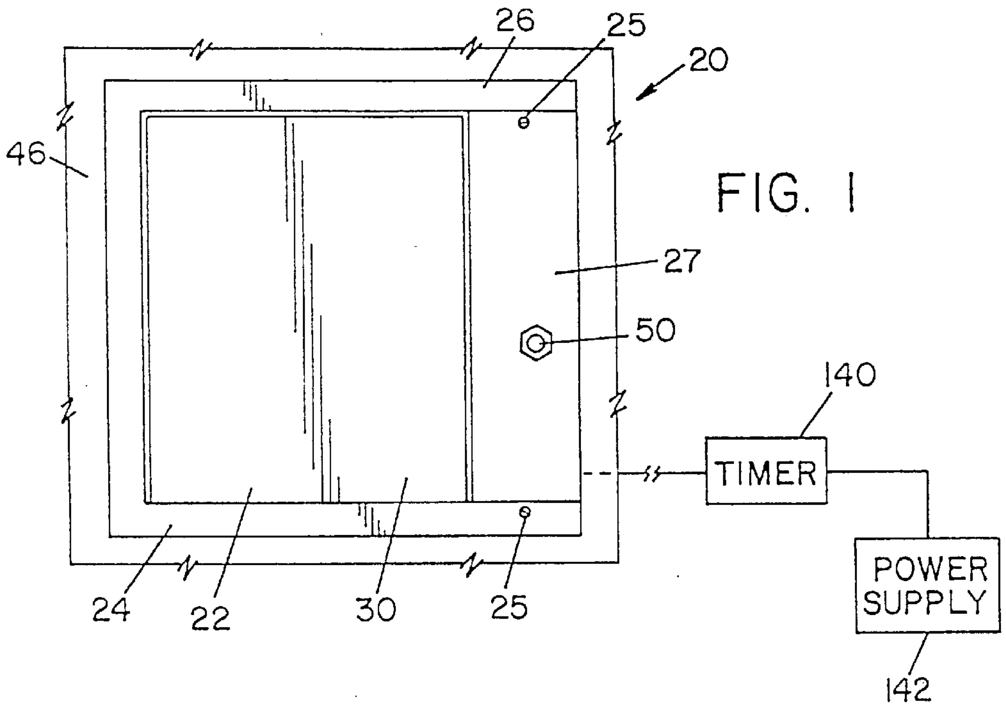
FIG. 1 is a front view of the door closure of the present invention and further illustrates the timer controller and power supply integrated therewith.

Referring now to the drawings, wherein the showings are for the purpose of illustrating the preferred embodiment of the invention only and not for the purpose of limiting the same, in FIG. 1 there is illustrated a chute closure 20 which includes a chute door 22 and frame 24. Frame 24 is formed to be mounted on a generally flat surface 46 and to surround the chute opening. As shown in FIG. 1, frame 24 is generally rectangular in shape and supports a generally rectangular chute door 22; however, frame and chute door are not limited to any particular shape. Frame 24 is preferably made of a durable and flame resistant material such as carbon steel and/or stainless steel. Frame 24 defines a generally rectangular chute opening. Frame 24 also includes a frame flange 26. Frame flange 26 is connected to at least the top of frame 24 and is used to secure frame 24 to surface 46. Frame 24 also includes a front panel 27 positioned next to chute door 22. Front panel 27 provides access to the movement mechanism of the chute door. Panel bolts 25 are inserted through panel 27 to secure the front panel to frame 24.

Figure 2:
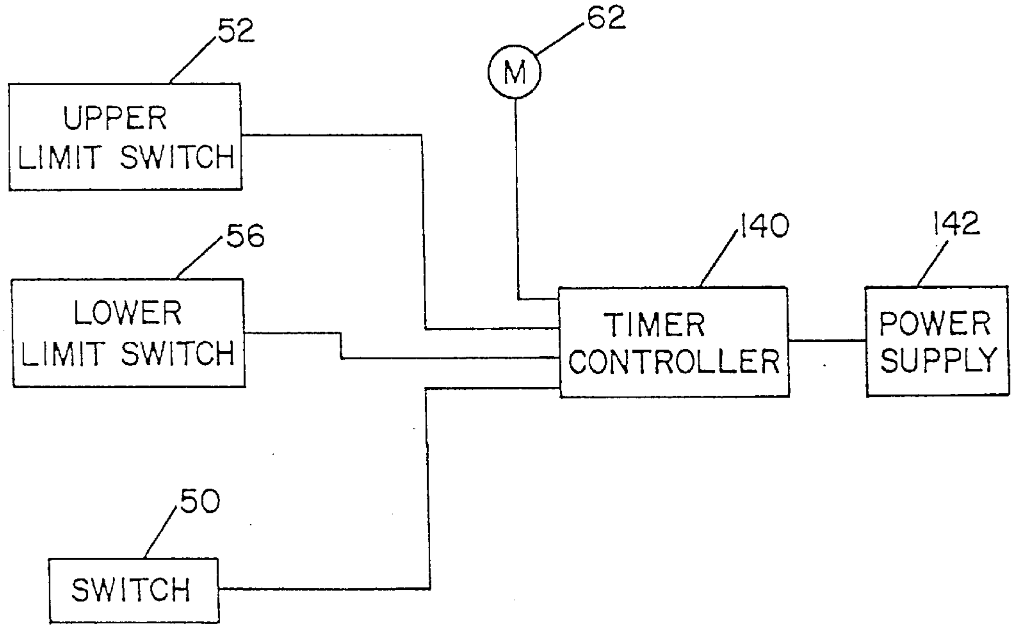
FIG. 2 is a block diagram of the control system for the invention of FIG. 1.

As illustrated in FIGS. 1 and 2, chute door 22 is preferably opened and closed by an electric motor 62. As will be described in more detail below, electric motor 62 is preferably part of a linear motion actuator 60. The electric motor is preferably a 24 Volt DC motor which is powered by power supply 142 and is controlled by timer controller 140 when switch 50 is activated by an operator. Power supply 142 is preferably a 24 volt DC power supply. As illustrated in FIG. 2, timer controller 140 receives input from several sources and directs power from power supply 142 to motor 62 to control the opening and closing of chute door 22. Timer controller 140 receives input from upper limit switch 52, lower limit switch 56 and switch 50. Switch 50 is preferably an Allen-Bradley standard push button switch. The lower limit and upper limit switches are preferably micro-switches. The timer controller is preferably a Magnescraft Time Delay Off Switch (0–30 seconds) 120 Volts. When switch 50 is actuated by an operator, timer controller 140 directs power from power supply 142 to motor 62. Timer controller 140 continues to allow power to be directed to motor 62 until a limit switch 52 indicates that the chute door 22 is in the closed position or the complete open position. In the design of the present invention, the lower limit switch 56 indicates that chute door 22 is in the closed position and upper limit switch 52 indicates that the chute door 22 is in the complete open position. Timer controller 140 preferably includes an internal timer to terminate power to motor 62 after a certain period of time has elapsed after switch 50 has been actuated. This time out sequence in timer controller 140 prevents motor 62 from burning out when chute closure 20 has been jammed in a partially opened position or timer controller 140 has not properly received the signal from upper limit switch 52 or lower limit switch 56. Preferably, the internal timer is set at no more than 30 seconds.

Figure 3:
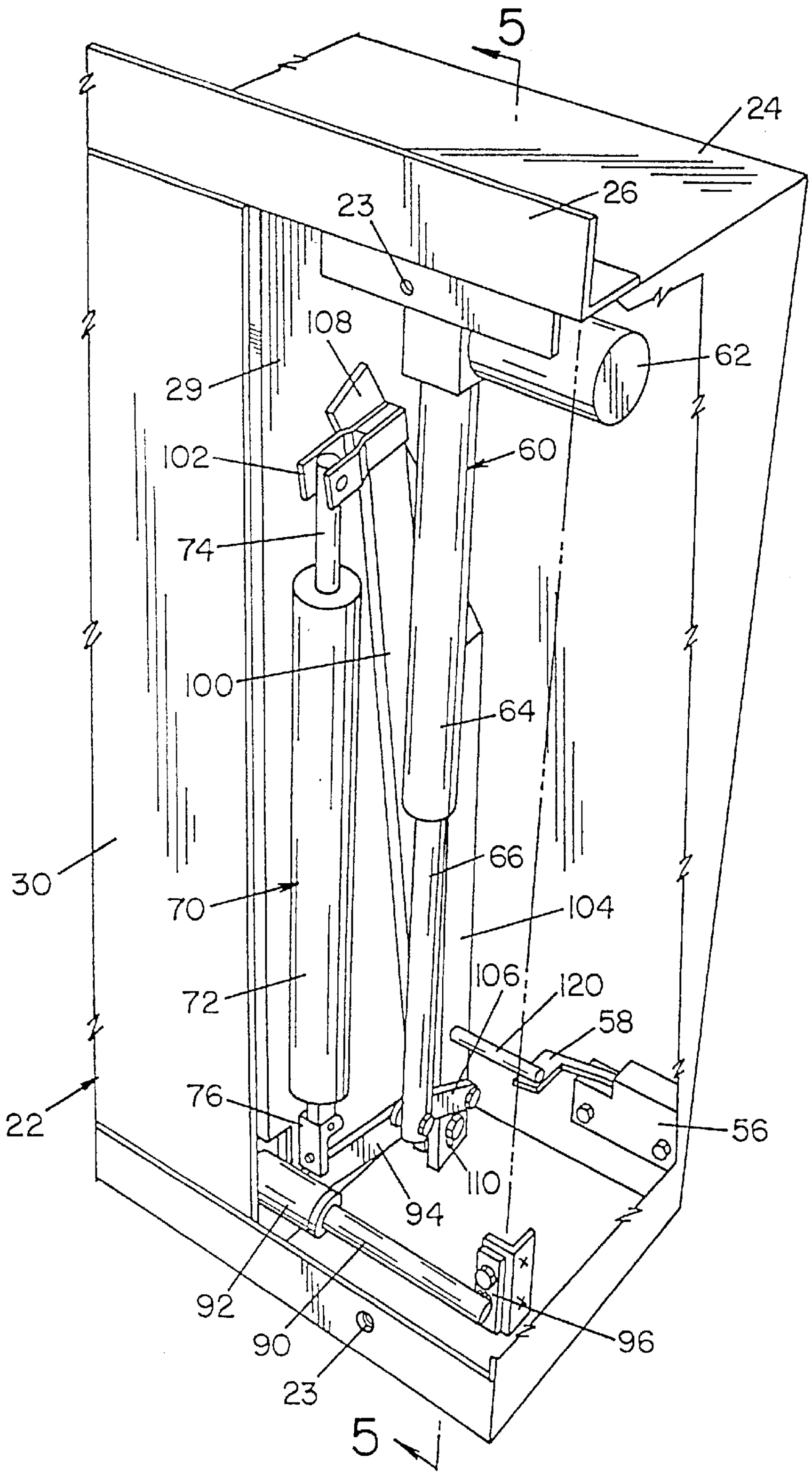
FIG. 3 is a partial perspective view of the invention of FIG. 1, partially in section, which illustrates the chute door movement arrangement.

Referring now to FIG. 3, the chute door movement mechanism is disclosed in detail. The chute door movement mechanism is preferably located behind the front panel 27 which is shown in FIG. 1. Front panel. 27 is bolted onto frame 24 by panel bolts 25 which are inserted into bolt holes 23. Front panel 27 can be easily removed by the removal of panel bolts 25 to allow maintenance to be performed on the chute door movement mechanism. As discussed above, chute door 22 is preferably opened and closed by an electrical, mechanism. Preferably, a linear motion actuator 60 is used for the chute door movement. Linear motion actuator 60 includes a motor 62, an actuator cylinder 64 and an actuator piston 66 which linearly moves within actuator cylinder 64. Preferably, the linear actuator is a 24 volt DC linear ball-driven motor actuator. The linear actuator is connected to frame 24 by motor bracket 68. Preferably, linear motion actuator 60 is pivotally attached to motor bracket 68 to allow the linear actuator to move as actuator piston 66 is retracted and withdrawn in actuator cylinder 64 during the opening and closing of chute door 22. The end of actuator piston 66 is connected to motor bar 106 which in turn is connected to coupling bar 104.

Figure 5:
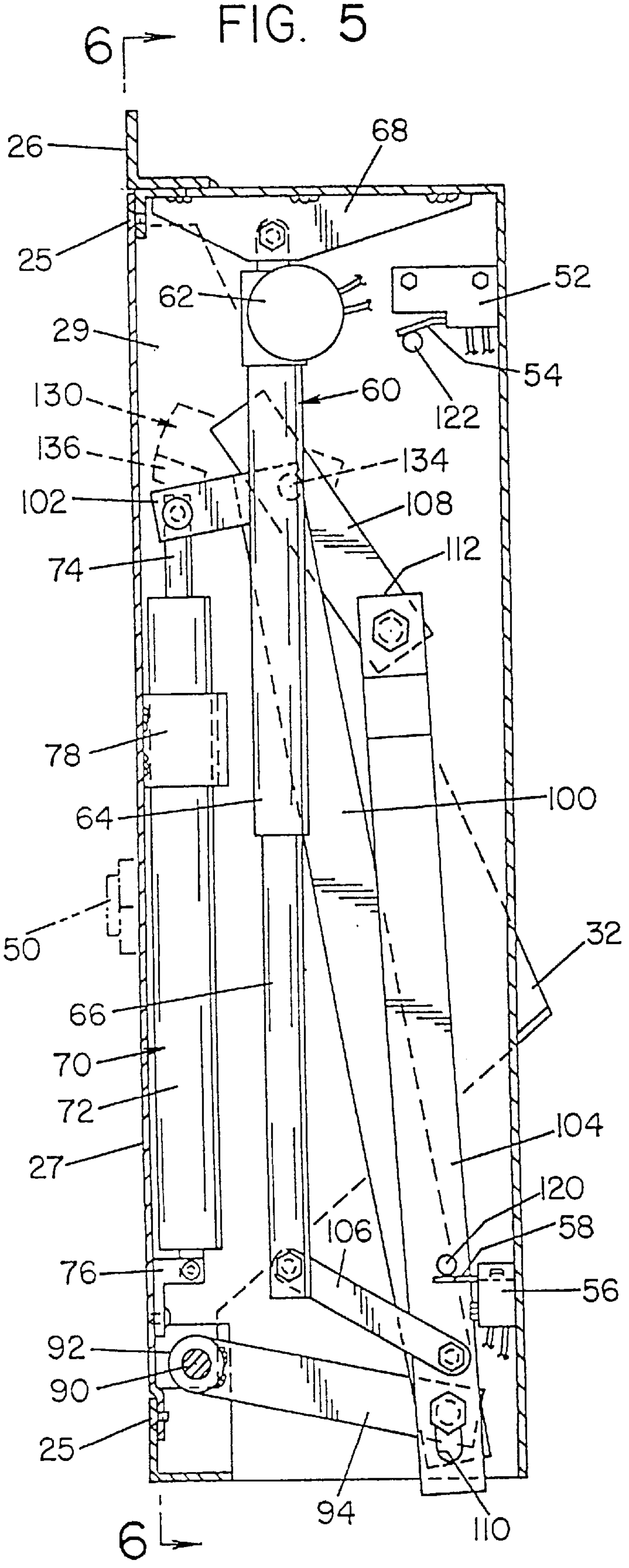
FIG. 5 is a cross-sectional elevation view taken along line 5—5 of FIG. 3.
Figure 6:
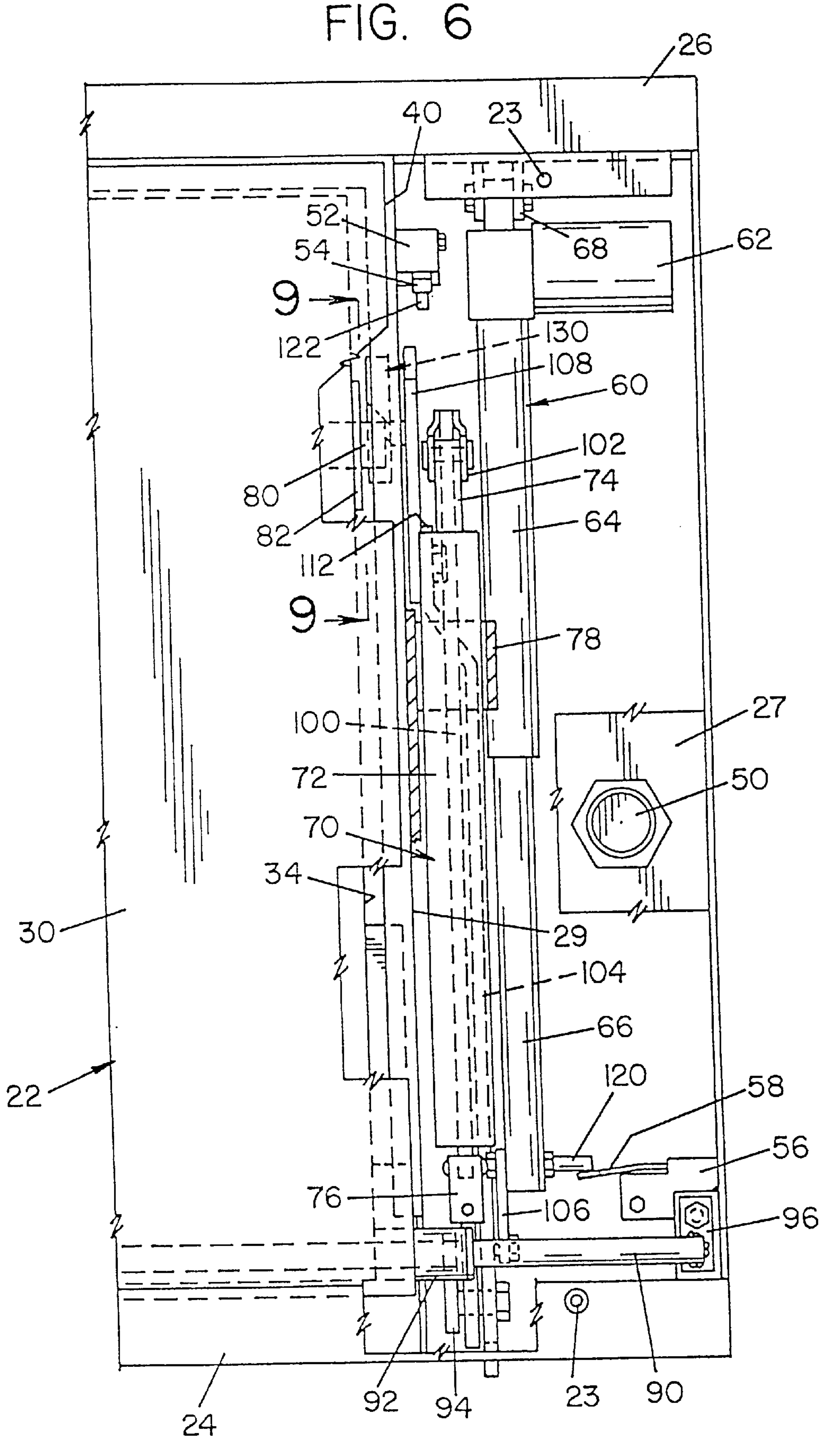
FIG. 6 is a cross-sectional elevational view taken along line 6—6 of FIG. 5.

The chute door movement mechanism also includes an air spring 70 which is made up of a spring cylinder 72 and a spring piston 74. Air spring 70 is pivotally mounted to front panel 27 by spring bracket 76. As best shown in FIG. 5, air spring 70 is stabilized by spring guide 78. Spring guide limits the movement of air spring 70 so that the air spring properly pivots on spring bracket 76. Spring guide 78 is preferably mounted to the inside surface of front panel 27. As is well known, and therefore not illustrated in the detail, the lower end of spring piston 74 extends into spring cylinder 72 and is attached to a piston which is reciprocal within the cylinder. As is further well known, such air springs are self-contained units charged with a suitable gas under pressure, such as nitrogen, and which gas is operable on opposite sides of the piston through a valving arrangement to control relative displacement between the piston and cylinder in response to a load which extends or retracts the piston rod relative to the cylinder. A gas pressure in the cylinder is selected to give a desired control based on the weight of the load, and in connection with the preferred embodiment herein illustrated and described, the air spring is designed to act as a counter weight to neutralize the weight of the chute door 22 during the opening and closing thereof. The upper end of spring piston 74 is pivotally connected to balance bar bracket 102 which in turn is rigidly connected to counter balance bar 100. The lower end of counter balance bar 100 is pivotally connected to coupling bar 104.

Coupling bar 104 includes a lower switch arm 120 which extends from coupling bar 104. Lower switch arm 120 is designed to contact lower switch bar 58 of lower limit switch 56 when chute door 22 is in the closed position. The interaction between lower switch arm 120 and lower limit switch 56 will be described in more detail hereinafter.

The lower end of coupling bar 104 is pivotally connected to coupler flange 94 which in turn is rigidly connected to pivot coupler 92. Pivot coupler 92 is designed to rotate about chute pivot bar 90. Chute pivot bar 90 is rigidly attached to frame 24 by pivot bar bracket 96. Chute door 22 is rigidly attached to pivot coupler 92 so that the chute door pivots about the base of frame 24. As described in more detail below, chute door 22 is opened by coupling bar 104 raising coupler flange 94 which in turn causes pivot coupler 92 to rotate about chute pivot bar 90 causing chute door 22 to rotate in an open position as disclosed in FIG. 4.

As best illustrated in FIG. 5, upper limit switch 52 is mounted to the inner surface frame 24 near the top of the frame. Upper limit switch 52 includes an upper switch bar 54 and an upper switch arm 122 rigidly mounted to upper switch bar 54.

Figure 4:
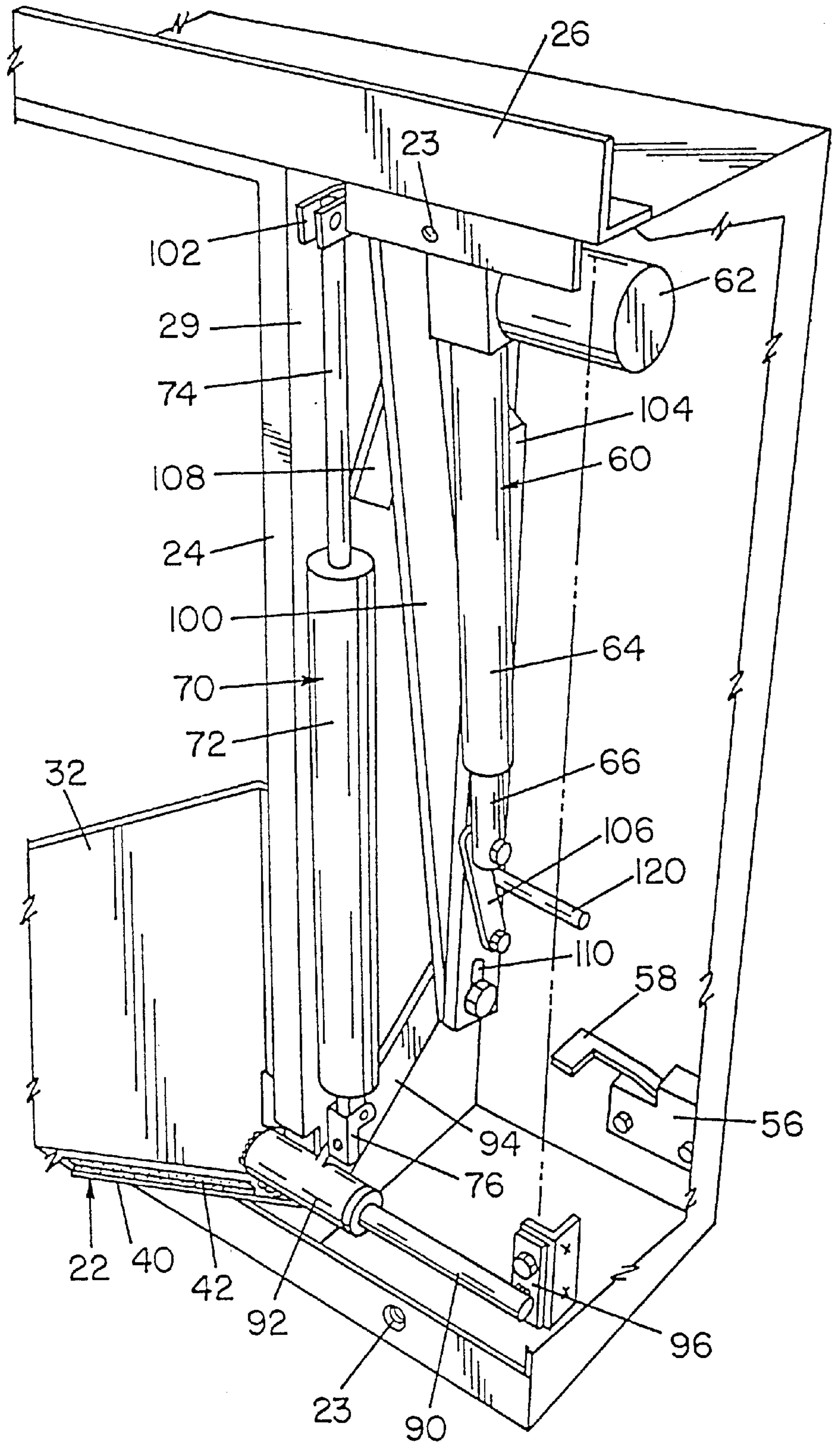
FIG. 4 is a partial perspective view of the chute closure as disclosed in FIG. 3 wherein the chute door is in the open position.
Figure 8:
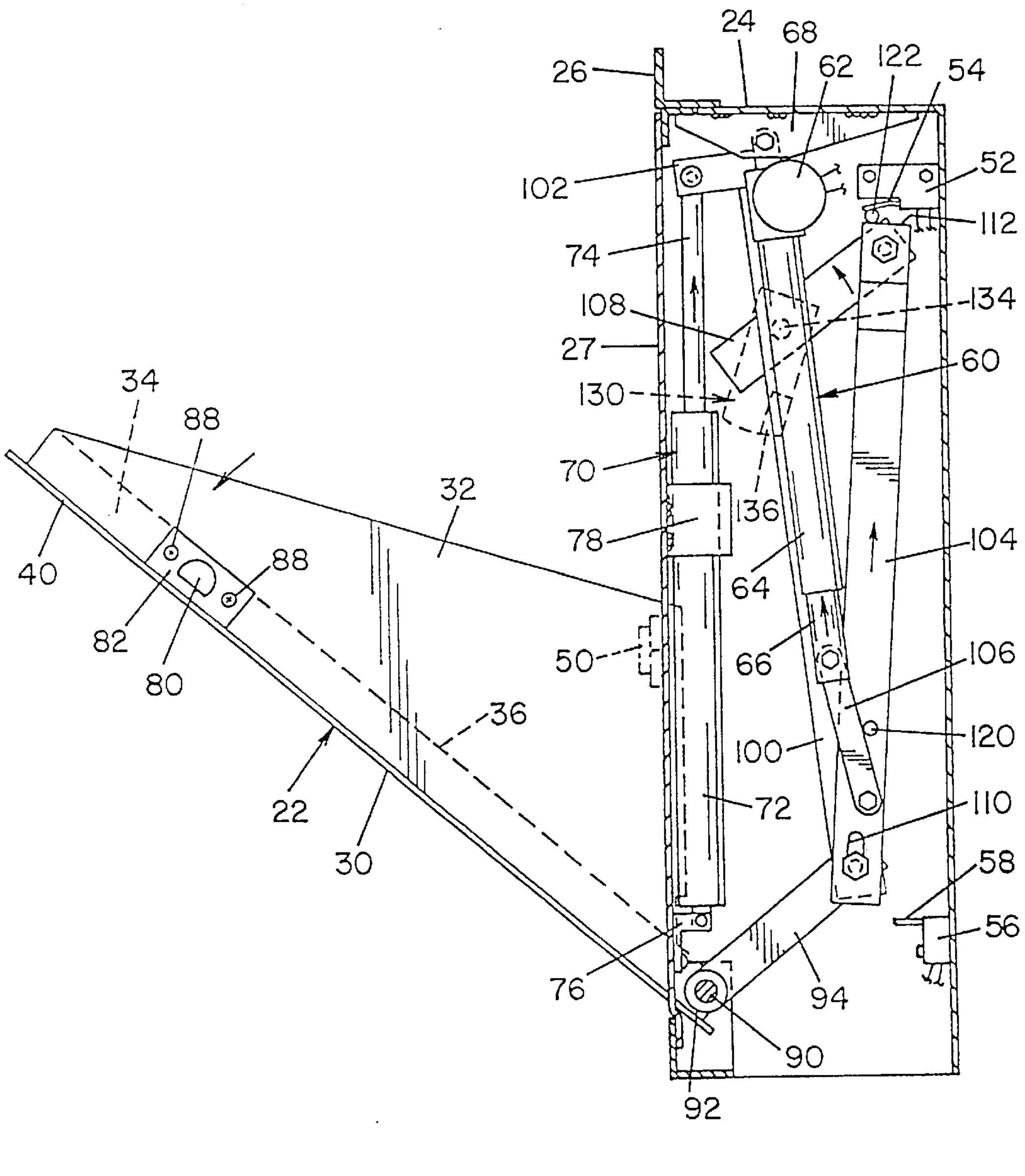
FIG. 8 is a side elevation view of the invention as shown in FIG. 5 and illustrates the movement of the chute door movement arrangement for the chute door in the complete open position.

As best illustrated in FIGS. 4 and 8, chute door 22 includes a chute front panel 30, chute side 34 and a chute back panel 36. Chute door 22 is designed to resist damage by fire and large forces such as from an explosion. Chute door 22 is preferably made of a 16 gauge 304 stainless steel and/or 16 gauge cold rolled steel. An insulating material may be disposed between the front and back panels of the chute door to reduce the amount of heat transferred from the back panel of the chute to the front panel when the back panel of the chute is exposed to fire and extreme temperatures. Chute door 22 also includes two chute side panels 32 mounted near the intersection of chute back 36 and chute side 34. Chute side panels 32 are incorporated onto chute door 22 to guide materials through the chute opening when chute door 22 is in the open position.

Referring now to FIG. 10, chute side 34 includes a latch bolt 80 slidably positioned between a face plate 82. Face plate 82 is mounted to chute side 34 by two plate screws 88. Latch bolt 80 slidably moves into and out of bolt housing 84. Latch bolt 80 is biased in the outward position by bolt Spring 86. Latch bolt 80 includes a tapered end 81. Tapered end 81 is positioned such that it faces away from the inner surface of frame 24. The operation of the latch bolt with respect to the opening and closing of chute door 22 will be described below.

Chute door 22 also includes a flange 40 attached to the outer edge of chute front panel 30. The flange 40 extends sufficiently outward to cover the space between chute door 22 and the chute opening when the chute door is in the closed position. The interior of flange 40 preferably includes a chute seal 42 which contacts the surface of frame 24 when chute door 22 is in the closed position. Chute seal 42 reduces or prevents gases, odors and flames from penetrating through the space between the chute door 22 and frame 24 when chute door 22 is in the closed position. Chute seal 42 preferably is made of a rubber material and is preferably attached to flange 40 by an adhesive substance.

Referring now to FIGS. 6–12, latch arm 130 is moveably mounted on frame side wall 29 by arm pin 134. Latch arm 130 includes a set screw 132 which rigidly attaches latch arm 130 to arm pin 134. Arm pin 134 extends through frame side wall 29 and is attached to latch bar 108 which in turn is rotatably attached to coupling bar 104. The front edge of latch arm 130 includes an arm tapered surface 136. As described more fully below arm, tapered surface 136 is designed to engage latch bolt 80 and cause latch bolt 80 to retract into bolt housing 84. As shown in FIG. 10, chute door 22 is in a closed position wherein chute seal 42 is in contact with frame 24 and chute door 22 is secured in the closed position by latch bolt 80. As shown in FIGS. 11 and 12, latch arm 130 is mounted to rotate downwardly such that arm tapered surface 136 can contact latch bolt 80 and force latch bolt 80 to retract within bolt housing 84 located in chute door 22. The retraction of latch bolt 80 from frame 24 allows chute door 22 to be opened.

The operation of the automatic chute door will now be described. As best illustrated-in FIG. 10, chute door 22 is maintained in a closed locked position by latch bolt 80. Latch bolt 80 insures that chute door 22 remains closed even when an inadvertent force, such as from an explosion, is applied to the chute back panel 36. As seen from FIG. 10, a force applied onto chute door 22 from chute back side 36 will cause latch bolt 80 to engage with frame 24 thus maintaining chute door 22 in a closed position.

Figure 7:
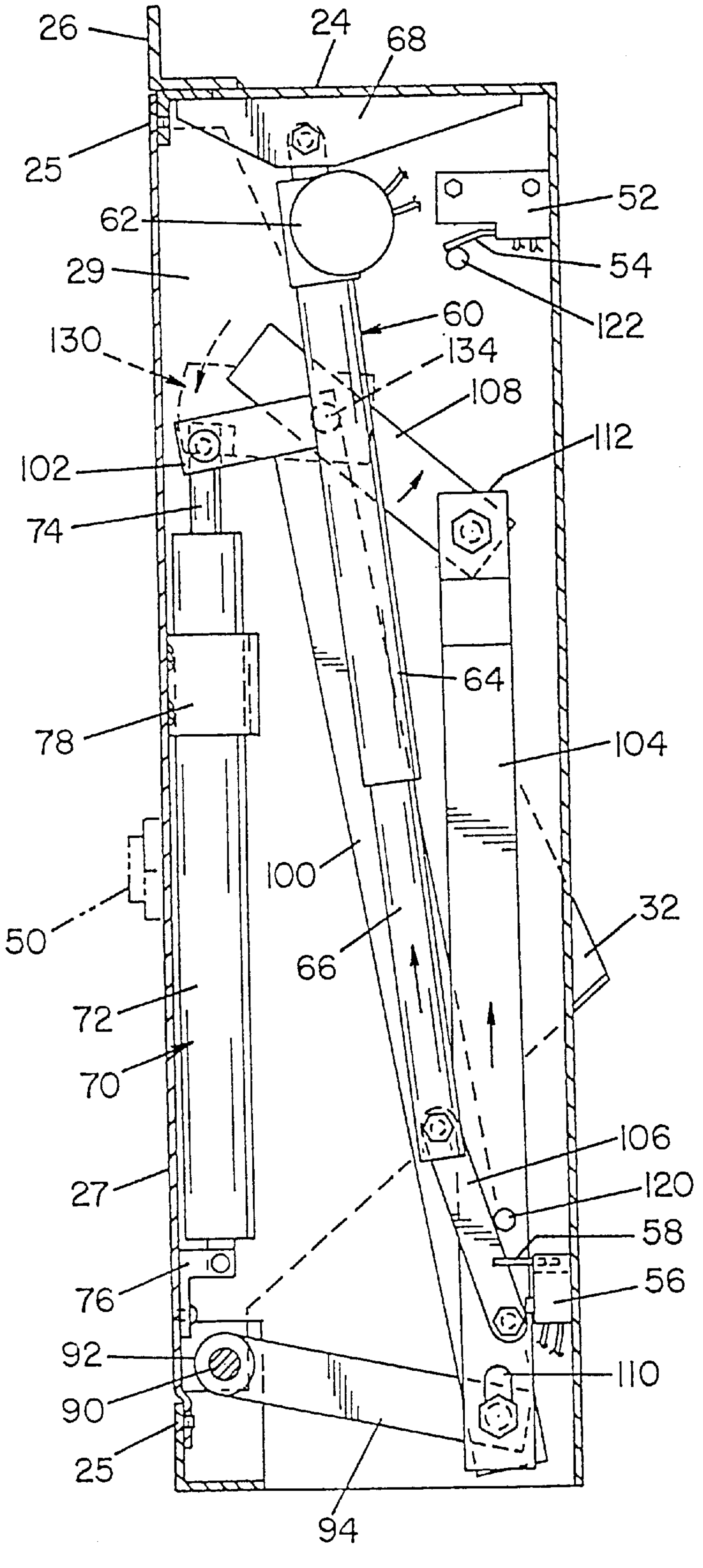
FIG. 7 is a side view of the invention as shown in FIG. 5 and illustrates the movement of the chute door movement arranged just prior to the opening of the chute door.

Chute door 22 is opened by an operator depressing switch 50 located on front panel 27. The pressing of switch 50 sends a signal to timer controller 140. Upon receiving the signal from switch 50, timer control 140 begins its preset time delay count down and directs power from power supply 142 to energize motor 62 of the linear motion actuator 60. Motor 62 causes actuator piston 66 to begin retracting into actuator cylinder 64 as shown in FIG. 7. The retraction of actuator cylinder 62 causes motor bar 106 to begin lifting coupler bar 104.

As best illustrated in FIG. 5, coupler bar 104 includes a coupling bar slot 110 which allows for coupling bar to be moved slightly upward prior to applying an upward force to coupler flange 94. The small upward movement of coupler bar 104 allowed by coupling bar slot 110 allows latch arm 130 to engage with latch bolt 80 to cause latch bolt 80 to retract within bolt housing 84. As best shown in FIG. 5 and FIG. 7, as coupling bar 104 is raised, coupling bar 104 forces latch bar 108 to begin rotating. The rotation of latch bar 108 thereby causes arm pin 134 to rotate which in turn causes latch arm 130 to rotate downwardly toward latch bolt 80 as illustrated in FIG. 7. The size of coupling bar slot 110 is of sufficient length. to allow coupler bar 104 to be sufficiently raised to cause latch arm 130 to fully retract latch bolt 80.

Once latch bolt 80 has been properly retracted as illustrated in FIG. 12, coupler bar 104 begins to move coupler flange 94 upwardly thereby causing pivot coupler 92 to rotate about chute pivot bar 90. The rotation of pivot coupler 92 in turn causes chute door 22 to begin opening.

As shown in FIGS. 7 and 8, when coupling bar 104 begins moving coupler flange upwardly, coupler bar 104 simultaneously begins to move counter balance bar 100 in the upward position. As counter balance bar 100 is moved in an upward position, spring piston 74 begins to extend from spring cylinder 72. Due to the design of air spring 70, spring piston 74 resists being extended from spring cylinder 72. This resistance creates a counter balancing effect to the weight of chute door 22 as chute door 22 moves to the open position. The counter balancing effect of air spring 70 to chute door 22 allows linear motion actuator 60 to smoothly operate during the opening of chute door 22. Although linear motion actuator 60 is designed to open chute door 22, a much larger linear actuator would be needed to both open and close the chute door due to the significant weight of the chute door if air spring 70 was not used. By use of the air spring as a counter weight, the size of the linear motion actuator can be significantly reduced thereby simplifying the design of the automatic chute closure and reducing the amount of energy necessary to open and close the chute door 22.

Referring now to FIG. 8, motor 62 continues to retract actuator piston 66 into actuator cylinder 64 until coupling bar top edge 112 contacts upper switch arm 122 which in turn moves upper switch bar 54 thereby activating upper limit switch 52. The activation of upper limit switch 52 sends a signal to timer control 140 thereby causing timer control 140 to terminate the power supply to motor 62. The positioning of upper limit switch 52 is such that the contact of coupling bar top edge 112 with upper switch arm 122 indicates when chute door 22 is in the complete open position as illustrated in FIG. 8. Once chute door 22 is in the complete open position, materials such as linens, refuse, disposable medical products, etc. are directed through the chute opening for disposal in the storage bin located at the end of the chute. If for some reason chute door 22 was jammed during opening thereby preventing coupling bar top edge from contacting upper switch arm 122, timer controller 140 would continue to direct power to motor 62 until the internal timer timed out. The timing out of the internal timer would cause timer controller 140 to terminate power to motor 62. Timer controller 140 would also terminate power to motor 62 if upper limit switch did not properly send a signal to the. timer controller 140 when coupling bar top edge 112 contacted upper switch arm 122. As is apparent, the timer controller has a safety backup to prevent the motor from continually running and overheating.

The chute door is closed as easily as it is opened by the operator once again depressing switch 50. Upon the activation of switch 50, timer controller 140 is once again activated thereby directing power from power supply 142 to energize motor 62. Motor 62 causes actuator piston 66 to begin extending from actuator cylinder 64. As actuator piston 66 extends from actuator cylinder 64, actuator piston 66 causes motor bar. 106 to force coupling bar 104 downwardly. The downward motion of coupling bar 104 causes coupler flange 94 to downwardly rotating which causes chute door 22 to begin moving toward the closed position. The downward movement of coupling bar 104 also causes counter balance bar 100 to move in a downwardly position. The downward position of counter balance bar 100 in turn causes spring piston 74 to begin to retract within spring cylinder 72 of air spring 70. Because of the design of air spring 70, the counter balance effect of air spring 70 assists in the closing of chute door 22. Actuator piston 66 continues to force coupling bar 104 into a downward position until lower switch arm 120 contacts lower switch bar 58 which in turn activates lower limit switch 56. The activation of lower limit switch 56 causes a signal to be sent to timer control 140 which in turn causes timer control 140 to terminate the power supply to motor 62.

As chute door 22 is nearly closed, tapered end 81 of latch bolt 80 contacts the front edge of frame 24. Chute door 22 proceeds to close since tapered end 81 is designed to cause latch bolt 80 to slidably retract into bolt housing 84 as the chute door 22 is moved into the closed position. Once latch bolt 80 has moved beyond the edge of frame 24 as shown in FIG. 10, latch bolt 80 moves out of bolt housing 84 to become fully extended due to the biasing effect of bolt spring 86. The extension of latch bolt 80 as shown in FIG. 10 prevents chute door 22 from being opened. until an operator once again activates switch 50. If during closing, timer controller 140 does not receive a signal from lower limit switch 56, the internal timer will time out causing timer controller 140 to terminate power to motor 62.

The invention has been described with reference to a preferred embodiment and alternates thereof. It is believed that many modifications and alterations to the embodiments disclosed will readily suggest themselves to those skilled in art upon reading and understanding the detailed description of the invention. It is intended to include all such modifications and alterations insofar as they come within the scope of the present invention.

What is claimed is:

1. A generally vertically extending chute terminating at an open end bounded by a frame mounted to a support surface and a chute door having a front surface, side surfaces extending from the front surface and a door pivot at the bottom of the front surface journalled at the frame whereby door opening, assisted by door gravity, results by rotation of the door front surface about the door pivot from a closed position, whereat the front surface is generally adjacent and closes the chute's open end while the side surfaces extend into the chute, to an open position, whereat the front surface is at least 45° displaced from its closed position and the side surfaces are out of the chute, the improvement comprising:

a first linkage arrangement adjacent one of the door side surfaces including a door pivot link extending from the door pivot, a pivotable variable length electric actuator link, and a plurality of interconnecting links pivotably connected to the door pivot and actuator link; an electric motor for varying the length of the electric actuator link which causes the chute door to rotate from an open to a closed position;

a second linkage arrangement adjacent said one of the door side surfaces resisting door opening and for assisting door closing, the second linkage arrangement including a variable length spring actuator link and an intermediate link pivotably secured to one end of the spring actuator link and the door pivot link, the other end of the spring actuator link being fixed to a front panel for permitting expansion and contraction of the spring actuator link in one direction, the spring actuator link having an increased length when the chute door is opened and a decreased length when the chute door is closed and an air spring controlling the length of the spring actuator link by exerting a force tending to keep the spring actuation link at a decreased length;

a manually operated switch for actuating the motor to open and close the chute door; and, an axially retractable lock between the frame and the chute door, a third linkage mechanism including a pivotable lock link for moving the lock between a locked and an unlocked condition, an intermediate pivotable door lock link pivotably connected to the lock link and the interconnecting link of the first linkage arrangement and the pivotable connection between the door pivot link and the interconnecting link in the first linkage arrangement being slotted whereby a lost motion connection assures unlocking the lock prior to door opening and locking the lock after door closing.

2. A door closure for a chute door which without said closure pivotably rotates by gravity from a closed to an open position and which has an axially movable lock, the chute door closure comprising:

an electric motor;

a pivoted, linearly variable actuator link having a variable length determined by operation of the motor, a rotatable door pivot link for rotating the chute door;

a plurality of interconnecting links pivotably connecting the door pivot link with the linear actuator link, one end of one of said interconnecting links that forms the pivotal connection having a slotted connection whereby movement of the linear actuator link in one direction rotates the door pivot link after the interconnecting links have moved the distance of the slotted connection;

an intermediate lock link pinned at one end thereof to the interconnecting links;

a rotatable latch crank pivotably pinned at one end thereof to the intermediate lock link, the latch crank having a lock releasing free end and a fixed pivot between its free end and its pinned end about which the latch crank rotates, whereby the lock releasing free end rotates upon actuation of the linear actuator in one direction before the door pivot link is caused to rotate; and, a switch for actuation of the electric motor.

3. The door closure of claim 2, further including an air spring, a variable length spring actuator link extending from the air spring and an intermediate link pivotably connected at one of its ends to the spring actuator link and at its other end to the door pivot link whereby the air spring assists movement of the linear actuator link when the pivot door link rotates in one direction.

4. The door closure of claim 2, further including open and close limit switches actuated by movement of the intermediate link and a time actuation circuit causing the electric motor to cease operating at a set time after switch actuation.

* * * * *